(12) United States Patent
Ikeda et al.

(10) Patent No.: US 9,395,006 B2
(45) Date of Patent: Jul. 19, 2016

(54) CHECK VALVE

(75) Inventors: Shunya Ikeda, Osaka (JP); Mutsunori Koyomogi, Osaka (JP); Megumu Makino, Osaka (JP); Toshiyuki Inada, Osaka (JP)

(73) Assignee: FUJIKIN INCORPORATED, Osaka-shi (JP)

( * ) Notice: Subject to any disclaimer, the term of this patent is extended or adjusted under 35 U.S.C. 154(b) by 232 days.

(21) Appl. No.: 14/124,860

(22) PCT Filed: May 31, 2012

(86) PCT No.: PCT/JP2012/064115
§ 371 (c)(1),
(2), (4) Date: Mar. 13, 2014

(87) PCT Pub. No.: WO2012/169425
PCT Pub. Date: Dec. 13, 2012

(65) Prior Publication Data
US 2014/0216575 A1    Aug. 7, 2014

(30) Foreign Application Priority Data

Jun. 10, 2011 (JP) ................. 2011-129720

(51) Int. Cl.
*F16K 15/02* (2006.01)
*F16K 25/00* (2006.01)
*F16K 17/04* (2006.01)

(52) U.S. Cl.
CPC ............. *F16K 15/026* (2013.01); *F16K 15/025* (2013.01); *F16K 17/0466* (2013.01); *F16K 25/005* (2013.01); *Y10T 137/7924* (2015.04)

(58) Field of Classification Search
CPC . F16K 15/026; F16K 17/0466; F16K 25/005; Y10T 137/7924; Y10T 137/7925; Y10T 137/7929
USPC ............................ 137/538, 540; 251/333, 334
See application file for complete search history.

(56) References Cited

U.S. PATENT DOCUMENTS

| 2,745,432 A * | 5/1956 | Williams ............... F16K 15/063 137/540 |
| 2005/0126638 A1* | 6/2005 | Gilbert .................. F16K 15/044 137/539 |
| 2012/0055400 A1 | 3/2012 | Hiroki et al. |

FOREIGN PATENT DOCUMENTS

| JP | 3-597 Y2 | 1/1991 |
| JP | 04-165163 A | 6/1992 |

(Continued)

OTHER PUBLICATIONS

International Search Report dated Jul. 3, 2012, issued for PCT/JP2012/064115.

*Primary Examiner* — Kevin Lee
*Assistant Examiner* — P. Macade Nichols
(74) *Attorney, Agent, or Firm* — Locke Lord LLP; James E. Armstrong, IV; Brian S. Matross

(57) ABSTRACT

To provide a check valve which can be used even under a high temperature condition by overcoming a drawback "valve element sticking to sealing member" associated with high temperature use while enhancing heat resistance. An opening of a fluid path formed in a first body is brought into a closed state by bringing a valve element biased by a biasing member into contact with a sealing member. The sealing member is formed of a post-cured perfluoro elastomer packing. An annular sealing portion which is brought into line contact with the sealing member is formed on the valve element.

2 Claims, 4 Drawing Sheets

(56) References Cited

FOREIGN PATENT DOCUMENTS

| JP | 06-042656 A | 2/1994 |
| JP | 07-002742 U | 1/1995 |
| JP | 07-269733 A | 10/1995 |
| JP | 10-311440 A | 11/1998 |
| JP | 2005-321060 A | 11/2005 |
| JP | 2005-343012 A | 12/2005 |
| JP | 2006-183634 A | 7/2006 |
| JP | 2010-236661 A | 10/2010 |

* cited by examiner

CHECK VALVE

TECHNICAL FIELD

The present invention relates to a check valve, and more particularly to a check valve which is suitable for the use under a high temperature condition where a temperature exceeds 200° C.

BACKGROUND ART

As a check valve, patent literature 1 discloses a check valve where an opening of a fluid path formed in a body is brought into a closed state when a valve element biased by a biasing member is brought into contact with an O-ring which constitutes a sealing member, and the valve element moves against a biasing force of the biasing me when a fluid pressure of a predetermined value or more is applied in the fluid path formed in the body.

CITATION LIST

Patent Literature

PTL 1: JP-UM-B-3-597

SUMMARY OF INVENTION

Technical Problem

To prevent liquefying of a gas which is made to flow through a pipe, a check valve which is used in a device maintained at a high temperature is required to exhibit heat resistance. However, the heat resistance of an O-ring used in the check valve disclosed in the above-mentioned patent literature 1 is not sufficient; thus giving rise to a drawback that the check valve is not suitable for the use under a high temperature condition.

To enable the use of a check valve under a high temperature condition, the use of a packing having excellent heat resistance in place of an 0-ring as a sealing member is considered. However, to use the check valve under a high temperature, there exists a drawback "valve element sticking to sealing member" associated with high temperature use and hence, it is difficult to acquire a check valve suitable for the use under a high temperature condition exceeding 200° C. by ply enhancing heat resistance.

It is an object of the present invention to provide a check valve which can be used even under a high temperature condition by overcoming a drawback "valve element sticking to sealing member" associated with high temperature use while enhancing heat resistance.

In a check valve according to the present invention which is configured to bring an opening of a fluid path formed in a body into a closed state by bringing a valve element biased by a biasing member into contact with a sealing member, and to bring the opening into an open state by moving the valve element against a biasing force of the biasing member when a fluid pressure of a predetermined value or more is applied in the inside of the fluid path formed in the body, it is characterized in that the sealing member is formed of a post-cured perfluoro elastomer packing, and an annular sealing portion which is brought into line contact with the sealing member is formed on the valve element.

To enable the use under a high temperature condition, the sealing member is formed of the perfluoro elastomer packing. Accordingly, heat resistance of the sealing member is ensured. As perfluoro elastomer, for example, Karlez (registered trademark) is named. The valve element is made of suitable metal such as stainless steel.

Inventors of the present invention have focused on sticking of the valve element to the sealing member, and have made various analyses on the sticking of the valve element. As a result of the analysis, the inventors have acquired the above-mentioned constitution as the constitution for decreasing such sticking.

Post-curing is a process in which a molded product is heated in a furnace at a high temperature of approximately 200° C. for several hours to several tens hours, and post-curing is performed as a step for removing impurities. Perfluoro elastomer possesses excellent chemical resistance and excellent heat resistance, and also possesses elasticity substantially equal to elasticity of rubber. Particularly, the heat resistance of perfluoro elastomer is excellent such that perfluoro elastomer maintains elasticity substantially equal to elasticity of rubber even at a high temperature of approximately 300° C. Perfluoro elastomer also has an advantage that an amount of gas discharged from perfluoro elastomer is small.

According to the check valve of the present invention, in addition to the formation of the annular sealing portion which is brought into line contact with the sealing member on the valve element, perfluoro elastomer is adopted as a material of the sealing member. Further, under a condition where natural cooling follows after temperature elevation, with respect to sticking of the valve element to the sealing member which cannot be sufficiently decreased by only adopting such line contact and perfluoro elastomer, such sticking can be lowered to a sufficient level by applying post-curing to perfluoro elastomer.

It is preferable that the valve element includes a circular columnar portion in which a fluid release path constituting a path for a fluid in an open state is formed, and a small-diameter circular plate portion which is contiguously formed with a distal end side of the circular columnar portion and closes the opening formed in the body, and the annular sealing portion of the valve element is formed of a first inclined surface which extends radially outwardly on a distal-end-side surface of the circular columnar portion, and a second inclined surface which is contiguously formed with the first inclined surface and extends radially outwardly.

Due to such a constitution, the valve element having the annular sealing portion which makes a line contact can be easily manufactured.

It is preferable that the sealing member has a circular plate portion interposed between an opening edge portion of the fluid path formed in the body and the annular sealing portion of the valve element, and a crushing margin of the circular plate portion by the annular sealing portion is set to 0.05 mm to 0.15 mm.

A crushing margin is the difference between a thickness of the sealing member before the sealing member is biased by the biasing member and the thickness of the sealing member after the sealing member is biased by the biasing member. To express the crushing margin of 0.05 mm to 0.15 mm as a ratio expressed as crushing margin/thickness before being biased, the ratio becomes 5.5% to 17%.

Due to such a constitution, an appropriate sealing force can be ensured and hence, sticking of the valve element to the sealing member can be made small.

Advantageous Effects of Invention

According to the check valve of the present invention, the sealing member is formed of a post-cured perfluoro elastomer packing, and the annular sealing portion which is brought into line contact with the sealing member is formed on the valve element and hence, sticking of the valve element to the sealing member which occurs when natural cooling follows temperature elevation can be eliminated. As a result, the check valve of the present invention can be suitably used under a high temperature condition.

Figure 1:
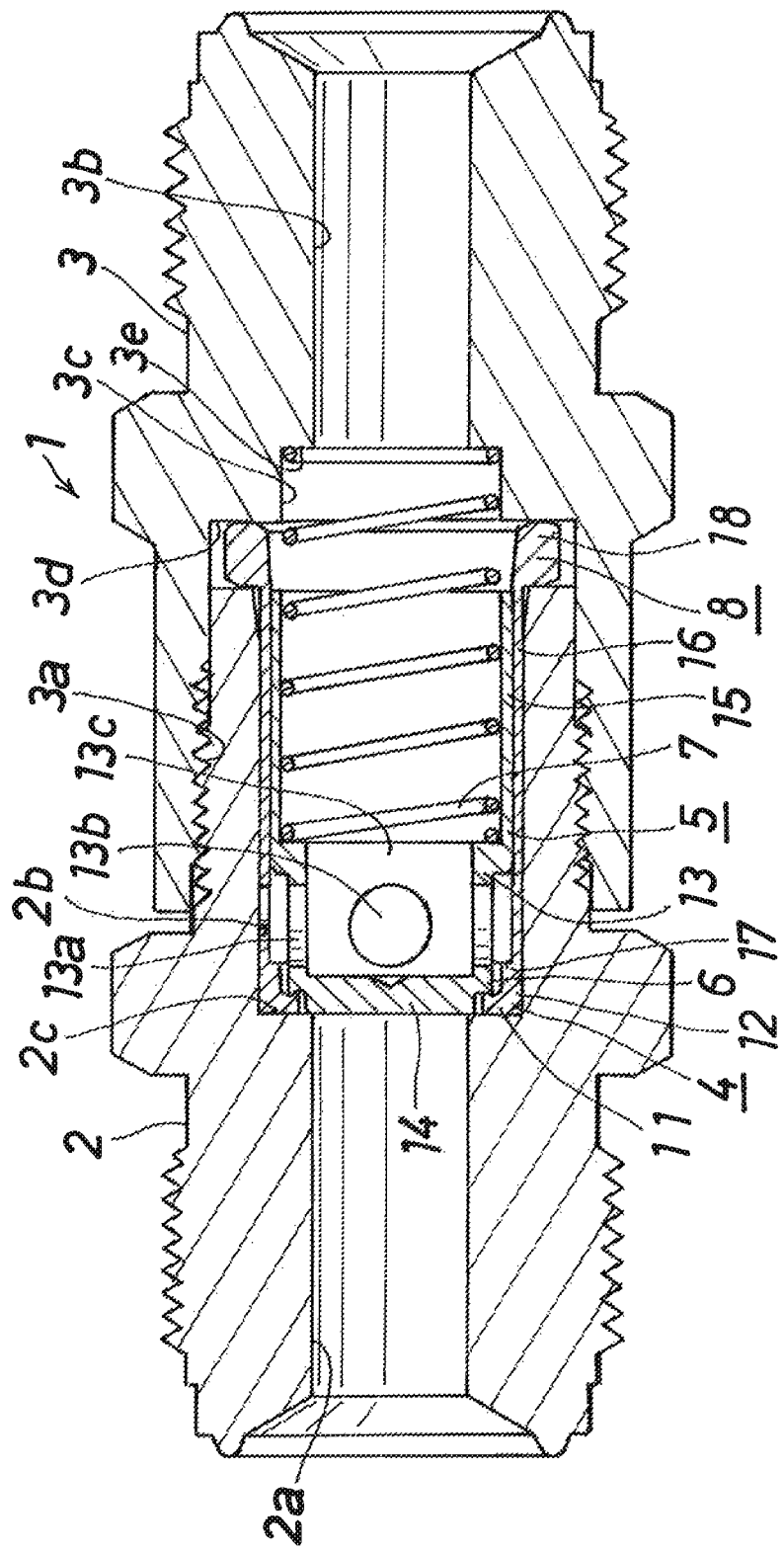
FIG. 1 A longitudinal cross-sectional view showing an embodiment of a check valve according to the present invention.

REFERENCE SIGNS LIST (1): check valve
(2): first body (body)
(4): sealing member
(5): valve element
(6): sealing portion
(6a): first inclined surface
(6b): second inclined surface
(7): biasing member
(11): circular plate portion
(13): circular columnar portion
(14): small-diameter circular plate portion
(13a), (13b), (13c): fluid release path
Description Of Embodiments An embodiment of the present invention is explained in conjunction with following drawings. In the explanation made hereinafter, "left" and "right" follow "left" and "right" of FIG. 1.

As shown in FIG. 1, a check valve (1) according to the present invention includes: a cylindrical first body (body) (2) which has a left small-diameter inner peripheral surface (2a) and a right large-diameter inner peripheral surface (2b) forming a fluid path; a cylindrical second body (3) screwed to the first body (2) includes a left large-diameter inner peripheral surface (3a), a right small-diameter inner peripheral surface (3b) and an intermediate inner peripheral surface (3c) interposed between the left large-diameter inner peripheral surface (3a) and the right small-diameter inner peripheral surface (3b) and has an intermediate diameter; an annular sealing member (4) which is received by an annul stepped portion (2c) between the small-diameter inner peripheral surface (2a) and the large-diameter inner peripheral surface (2b) of the first body (2); a valve element (5) which is brought into contact with the sealing Member (4) from a right side by way of an annular sealing portion a biasing member (7) which biases the valve element (5) leftward (toward the sealing member (4)); and a grand packing (8) which seals a gap between the first body (2) and the second body (3).

The first body (2) and the second body (3) are joined to each other due to the threaded engagement between a male threaded portion formed on a right outer periphery of the first body (2) and a female threaded portion formed on the large-diameter inner peripheral surface (3a) of the second body (3).

The sealing member (4) is formed of a post-cured perfluoro elastomer packing, and the sealing member (4) is constituted of a circular plate portion (11) which is interposed between an opening edge portion of the small-diameter inner peripheral surface (2a) of the first body (2) and the sealing portion (6) of the valve element (5), and a circular cylindrical portion (12) which extends rightward from an outer peripheral portion of the circular plate portion (11). An outer diameter of the sealing member (4) is substantially equal to an inner diameter of the large-diameter inner peripheral surface (2b) of the first body (2) and an inner diameter of the sealing member (4) is set larger than an inner diameter of the small-diameter inner peripheral surface (2a) of the first body (2)

The valve element (5) is constituted of a circular columnar portion (13) in which fluid release paths (13a), (13b) (13c) are formed, a small-diameter circular plate portion (14) which is contiguously formed with a left side (distal end side) of the circular columnar portion (13) and has an outer diameter smaller than an outer diameter of the circular columnar portion (13), and a large-diameter circular cylindrical portion (15) which is contiguously formed with a right side (proximal end side) of the circular columnar portion (13) and has an outer diameter larger than the diameter of the circular columnar portion (13).

With respect to the valve element (5), a left surface of an outer peripheral portion of the small-diameter circular plate portion (14) is brought into contact with a right-end opening edge portion of the small-diameter inner peripheral surface (2a) of the first body (2), and the annular sealing portion (6) mounted on a left-end outer peripheral portion of the circular columnar portion (13) pushes a right surface of the circular plate portion (11) of the sealing member (4) and hence, a right-end opening of the small-diameter inner peripheral surface (fluid path) (2a) of the first body (2) is brought into a closed state.

The fluid release paths (13a), (13b), (13c) formed in the circular columnar portion (13) are formed so as to introduce a fluid present on an outer peripheral surface of the circular columnar portion (13) into the inside of the large-diameter circular cylindrical portion (15).

The biasing member (7) is formed of a cylindrical compression coil spring. A left end surface of the biasing member (7) is received by a right surface of the circular columnar portion (13) of the valve element (5), and a right end surface of the biasing member (7) is received by a stepped portion (3e) formed between the small-diameter inner peripheral surface (3b) and the intermediate inner peripheral surface (3c) of the second body (3).

The grand packing (8) is constituted of a circular cylindrical portion (16), an inwardly extending flange portion (17) which is formed on a left-end opening edge portion of the circular cylindrical portion (16), and an outwardly extending flange portion (18) formed on a right-end opening edge portion of the circular cylindrical portion (16). The inwardly extending flange portion (17) is brought into contact with a right surface of the circular cylindrical portion (12) of the sealing member (4). The outwardly extending flange portion (18) is formed in an approximately rectangular shape elongated in the axial direction, and is sandwiched between a left end surface of the first body (2) and a stepped portion (3d) formed between the large-diameter inner peripheral surface (3a) and the intermediate inner Peripheral surface (3c) of the second body (3). When the first body (2) and the second body (3) are threadedly engaged with each other, the grand packing) is deformed by a predetermined amount thus providing sealing between the first body (2) and the second body (3).

According to this check valve (1), in a state shown in FIG. 1, the sealing portion (6) of the valve element (5) which is biased by the biasing member (7) is brought into contact with the circular plate portion (11) of the sealing member (4) from a right side and hence, a closed state is acquired. A fluid is introduced into the inside of the small-diameter inner peripheral surface (2a) of the first body (2). When a pressure of the fluid is small compared to a biasing force generated by the biasing member (7), the closed state is continued. When the fluid pressure is increased, the valve element (5) moves rightward against the biasing force of the biasing member (7) due to such a fluid pressure and hence, a path is formed where the fluid passes between an opening of the small-diameter inner peripheral surface (2a) of the first body (2) and a gap formed between the valve element. (5) and the sealing member (4), flows into the inside of the large-diameter cylindrical portion (15) from the fluid release paths (13a), (13b), (13c) formed in the valve element (5), and flows into the inside of the small-diameter inner peripheral surface (3b) of the second body (3) so that an open state is acquired.

Figure 2:
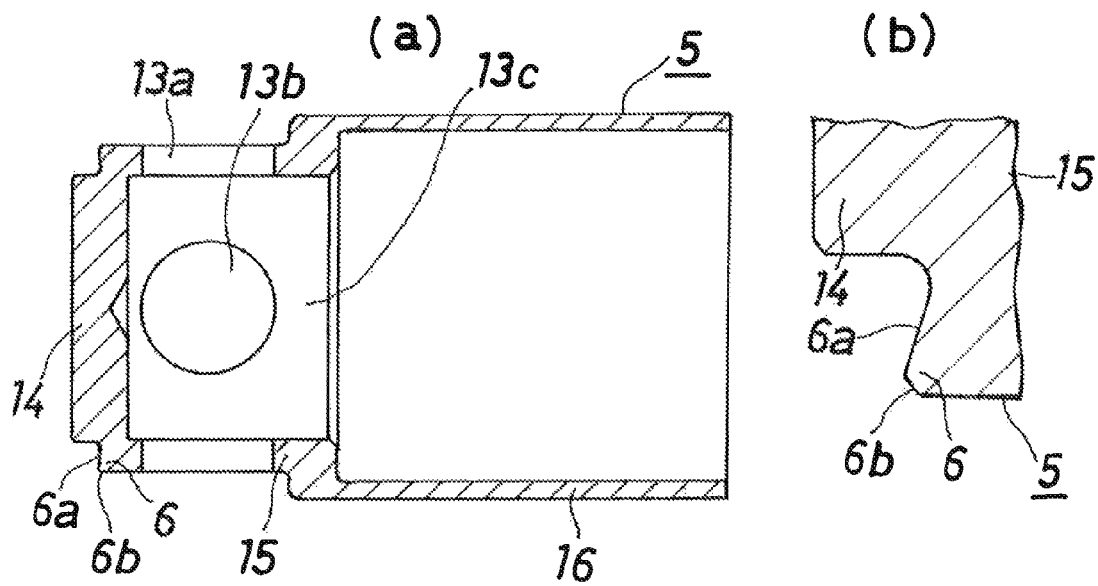
FIG. 2 A longitudinal cross-sectional view showing a valve element of the check valve according to the present invention, wherein (b) is an enlarged view showing an annular sealing portion which constitutes an essential part in (a)

As shown in FIG. 2 in an enlarge manner, the sealing portion (6) (a surface which is brought into contact with the sealing member (4)) of the valve element (5) is formed of a first inclined surface (6a) which extends radially outwardly from a boundary with the small-diameter circular plate portion (14) on a distal-end-side surface of the circular columnar portion (13), and a second inclined surface (6b) which is contiguously formed with the first inclined surface (6a) and extends radially outwardly.

Figure 3:
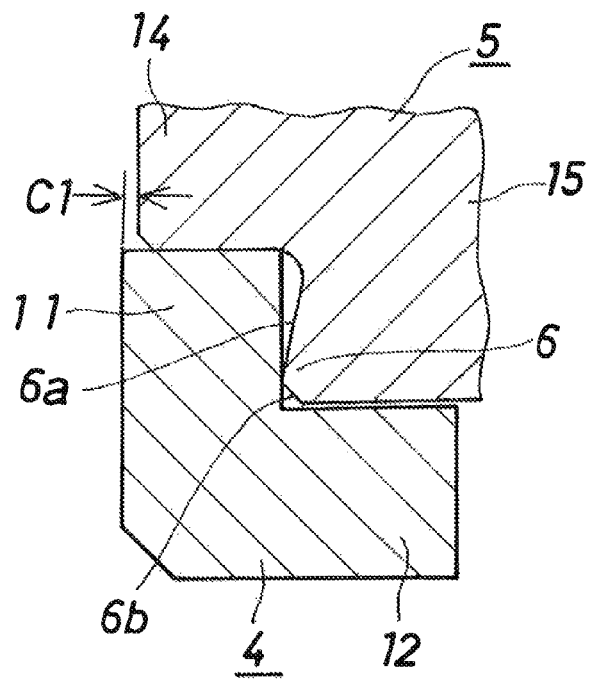
FIG. 3 An enlarged longitudinal cross-sectional view showing the positional relationship between the valve element and a sealing member of the check valve according to the present invention.

FIG. 3 is a view showing the positional relationship between the sealing member (4) and the valve element (5) before the valve element (5) is biased by the biasing member (7). In the drawing, the sealing portion (6) of the valve element (5) is brought into line contact with the sealing member (4), and has C1 as a crushing margin. When a biasing force of the biasing member (7) acts on the valve element (5) in such a state, the valve element (5) moves leftward and, as shown in FIG. 1, the left surface (distal end surface) of the small-diameter circular plate portion (14) of the valve element (5) is brought into contact with the opening edge portion of the smaller-diameter inner peripheral surface (2a) of the first body (2) and becomes coplanar with the left surface of the sealing member (4) Since the sealing member (4) is compressed by a crushing margin of C1, the sealing member (4) performs a sealing function.

Figure 4:
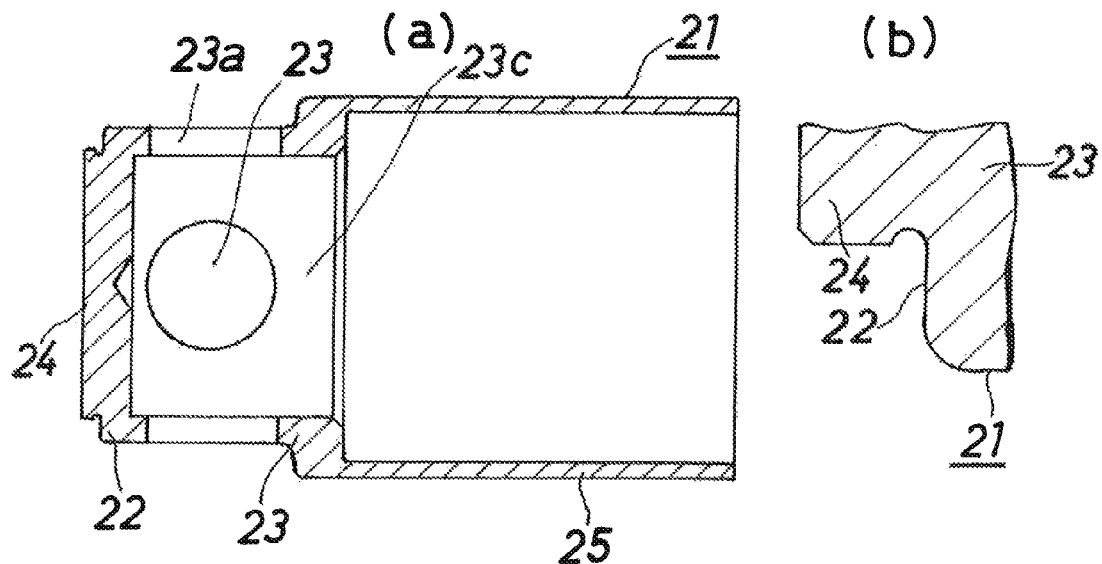
FIG. 4 A longitudinal cross-sectional view showing a valve element of a comparison example of a check valve, wherein (b) is an enlarged view of an annular sealing portion which constitutes an essential part in (a).

FIG. 4 shows a valve element (21) as a comparison example. The valve element (21) is constituted of a circular columnar portion (23) in which fluid release paths (23a), (23b), (23c) are formed, a small-diameter circular plate portion (24) which is contiguously formed with a left side (distal end side) of the circular columnar portion (23), and a large-diameter circular cylindrical portion (25) which is contiguously formed with a right side (proximal end side) of the circular columnar portion (23). The sealing portion (22) of the valve element (21) forms a flat surface of a left-surface outer peripheral portion of the circular columnar portion (23).

Figure 5:
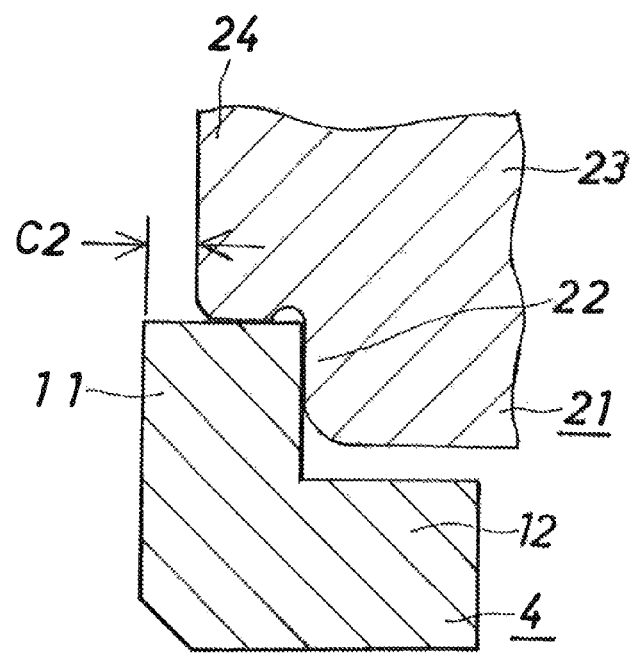
FIG. 5 A longitudinal cross-sectional view showing the positional relationship between a valve element and a sealing member of a comparison example of the check valve.

FIG. 5 is a view showing the positional relationship between the sealing member (4) and the valve element (21) before the valve element (21) is biased by the biasing member (7) when the sealing member (4) Which is the same sealing member used in FIG. 3 is combined with the valve element (21) shown in FIG. 4. In the drawing, an annular sealing portion (22) of the valve element (21) is brought into face contact with the sealing member (4), and has C2 as a crushing margin.

The embodiment shown in FIG. 2 and FIG. 3 can be suitably used under a high temperature use condition compared to the comparison example shown in FIG. 4 and FIG. 5.

To enable the check valve to be suitably used under a high temperature use condition, inventors of the present invention focused on sticking of the valve element (5), (21) to the sealing member (4), and measured an opening start pressure (a pressure value at which a fluid release function of the check valve (1) appears) under various conditions. "Sticking" means the adhesion of the sealing member (packing) (4) to the valve element (5), (21). In this case, to move the valve element (5), (21) by a fluid pressure, a fluid pressure corresponding to a sum of a biasing force of the biasing member (7) and an adhesive force becomes necessary. That is, the opening start pressure is increased along with the increase of the adhesive force.

Figure 6:
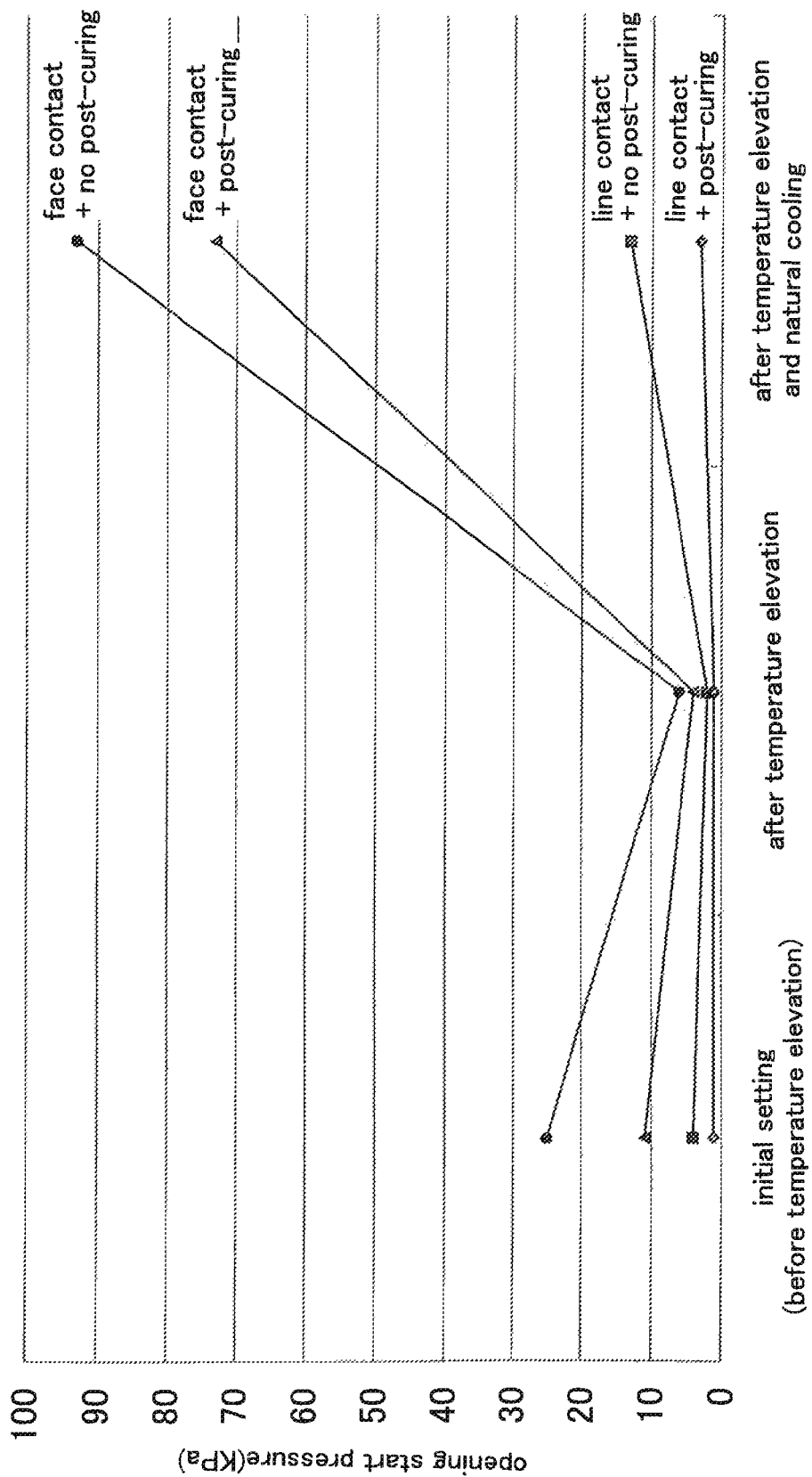
FIG. 6 A graph showing a result of measurement of "opening start pressure" of the check according to the present invention.

Assume C1 in FIG. 3 as 0.1 mm and C2 in FIG. 5 as 0.3 mm. An opening start pressure was measured with respect to cases where the crushing margin is combined with the sealing member (4) Whose circular plate portion (11) has a thickness of 0.9 mm, and one example of the measurement result of the opening start: pressure is shown in FIG. 6. An opening start pressure is measured such that a pressure of 1 MPa is applied from a right side of the check valve (1) shown in FIG. 1 and, thereafter, a fluid is introduced into the check valve (1) from a left side and the pressure is gradually increased, and a fluid pressure immediately before the pressure is lowered due to opening of the opening of the small-diameter inner peripheral surface (2a) of the first body (2).

FIG. 6 shows the result of evaluation which was made under three conditions, that is, at the time of performing initial setting (before temperature elevation), after temperature elevation and after natural cooling (natural cooling after temperature elevation) on four check valves consisting of the check valve where the valve element (5) has a shape shown in FIG. 2 and FIG. 3 (line contact type) and not being subjected to post-curing, the check valve where the valve element (5) has the shape shown in FIG. 2 and FIG. 3 (line contact type) and being subjected to post-curing, the check valve where the valve element (21) has the shape shown in FIG. 4 and FIG. 5 (face contact type) and not being subjected to post-curing and the check valve where the valve element (21) has the shape shown in FIG. 4 and FIG. 5 (face contact type) and being subjected to post-curing.

According to the measurement result shown in FIG. 6, it is found that sticking is particularly large after temperature elevation and natural cooling are performed, and the check valve of a face contact type exhibits large sticking after such cooling. By changing the check valve from the face contact type to the line contact type, sticking after cooling becomes small such that sticking is lowered, to a level substantially equal to the level at the time of initial setting in the check valve of face contact type. Further, by providing post-curing to the sealing member, sticking can be decreased regardless of the face contact type and the line contact type. Particularly, the check valve of the line contact type to which post-curing is applied exhibits a small opening start pressure, and also exhibits a small change even when conditions are changed.

From this result, it is found that it is desirable to bring the valve element (5) and the sealing member (4) into line contact to decrease sticking (opening start pressure), and it is preferable to apply post-curing to perfluoro elastomer which is a material for forming the sealing member (4).

In FIG. 1, the line check valve (1) where the body (2), (3) as a shape similar to a shape of a pipe joint is exemplified. However, the check valve of the present invention is not limited to such a line check valve (1). Provided that an opening of a fluid path formed in a body is brought into a closed state by bringing a valve element biased by a biasing member into contact with a sealing member, and the opening of the fluid path is brought into an open state by moving the valve element against a biasing force of the biasing member when a fluid pressure of a predetermined value or more is applied in the inside of the fluid path in the body, a shape of the body, a shape of the fluid path, the constitution of the biasing member and other constitutions can be changed in a various manner.

In the embodiment, the sealing portion (6) of the valve element (5) is formed of the first inclined surface (6a) extending radially outwardly from the boundary with the small-diameter circular plate portion (14) on the distal-end-side surface of the circular columnar portion (13), and the second inclined surface (6b) contiguously formed with the first inclined surface (6a) and extending radially outwardly. However, the first inclined surface (6a) may be formed such that the first inclined surface (6a) extends radially outwardly from a position, close to the outside than the boundary with the small-diameter circular plate portion (14). That is, the sealing portion (6) may have any shape provided that the contact with the sealing member (4) becomes a line contact. For example, it may be possible to adopt the structure where an annular projection is formed on a radially intermediate portion of the sealing portion (flat surface) (22) shown in FIG. 4 or the structure where a projection is formed only on an outer peripheral portion of the sealing portion (flat surface) (22).

Industrial Applicability

The check valve according to the present invention is suitably used under a high temperature condition exceeding 200° C. According to the check valve of the present invention, heat resistance can be enhanced and, at the same time, a drawback "valve element sticking to sealing member" associated with the use at a high temperature can be overcome so that the check valve according to the present invention can be suitably used under a high temperature condition.

The invention claimed is:

1. A check valve which is configured to bring an opening of a fluid path formed in a body into a closed state by bringing a valve element biased by a biasing member into contact with a sealing member, and to bring the opening into an open state by moving the valve element against a biasing force of the biasing member when a fluid pressure of a predetermined value or more is applied in the fluid path formed in the body, wherein the sealing member is formed of a post-cured perfluoro elastomer packing, an annular sealing portion which is brought into line contact with the sealing member is formed on the valve element, the valve element includes a circular columnar portion in which a fluid release path constituting a path for a fluid in an open state is formed, and a circular plate portion which is contiguously formed with a distal end side of the circular columnar portion and closes the opening formed in the body, and the annular sealing portion of the valve element is formed of a first inclined surface which extends radially outwardly on a distal-end-side surface of the circular columnar portion, and a second inclined surface which is contiguously formed with the first inclined surface and extends radially outwardly.

2. The check valve according to claim 1, wherein the sealing member has a circular plate portion interposed between an opening edge portion of the fluid path formed in the body and the annular sealing portion of the valve element, and a crushing margin of the circular plate portion by the annular sealing portion is set to 0.05 mm to 0.15 mm.

* * * * *